April 11, 1939.    R. J. WISE    2,153,858
TELEGRAPHIC TRANSMISSION OF INTELLIGENCE
Filed May 28, 1935    6 Sheets-Sheet 3
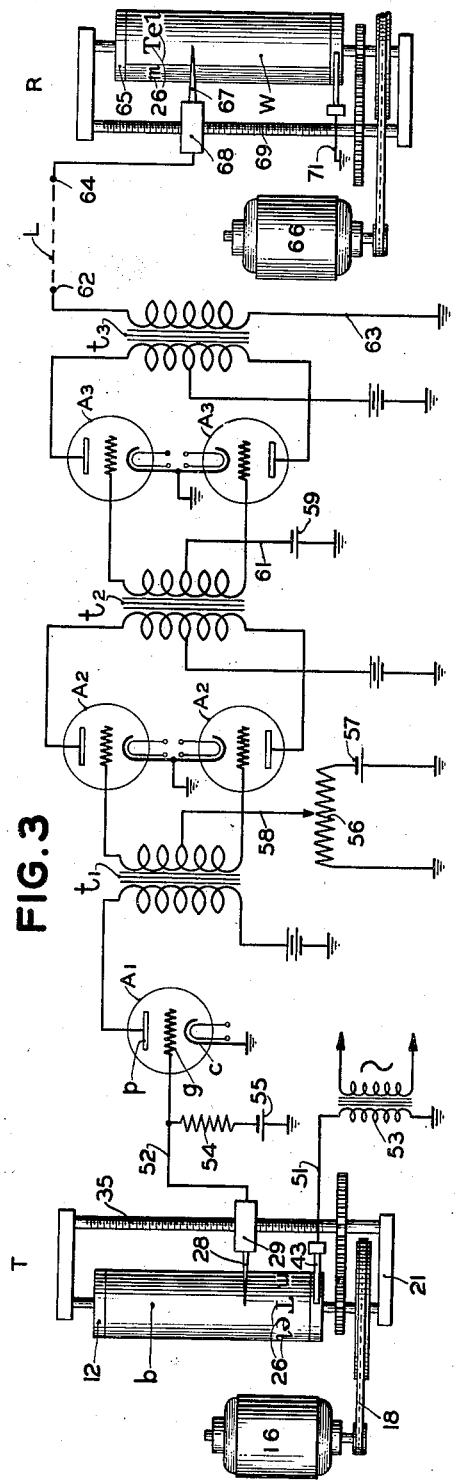
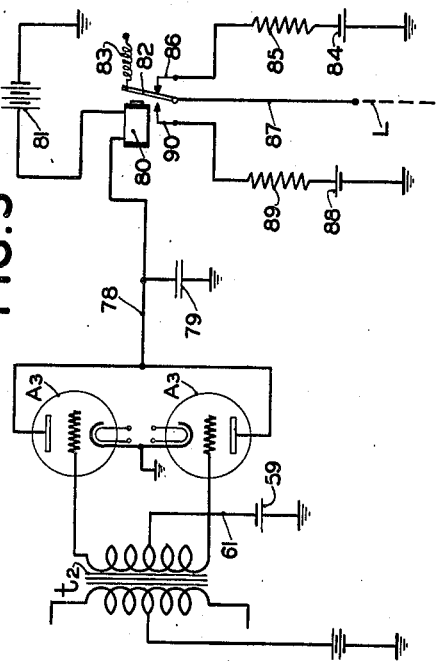
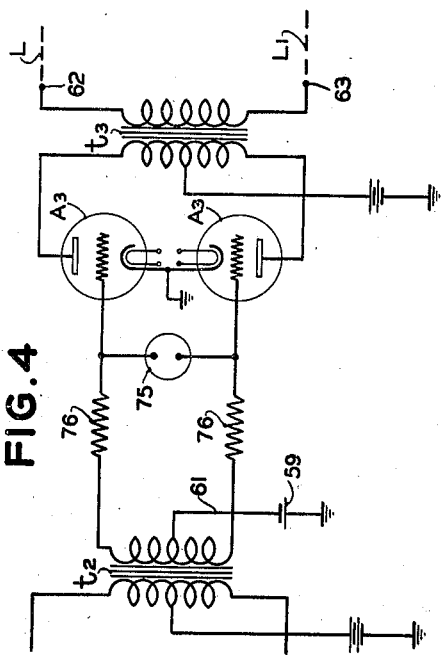
INVENTOR
R.J.WISE
BY Eugene C. Brown
ATTORNEY April 11, 1939.    R. J. WISE    2,153,858
TELEGRAPHIC TRANSMISSION OF INTELLIGENCE
Filed May 28, 1935    6 Sheets-Sheet 4
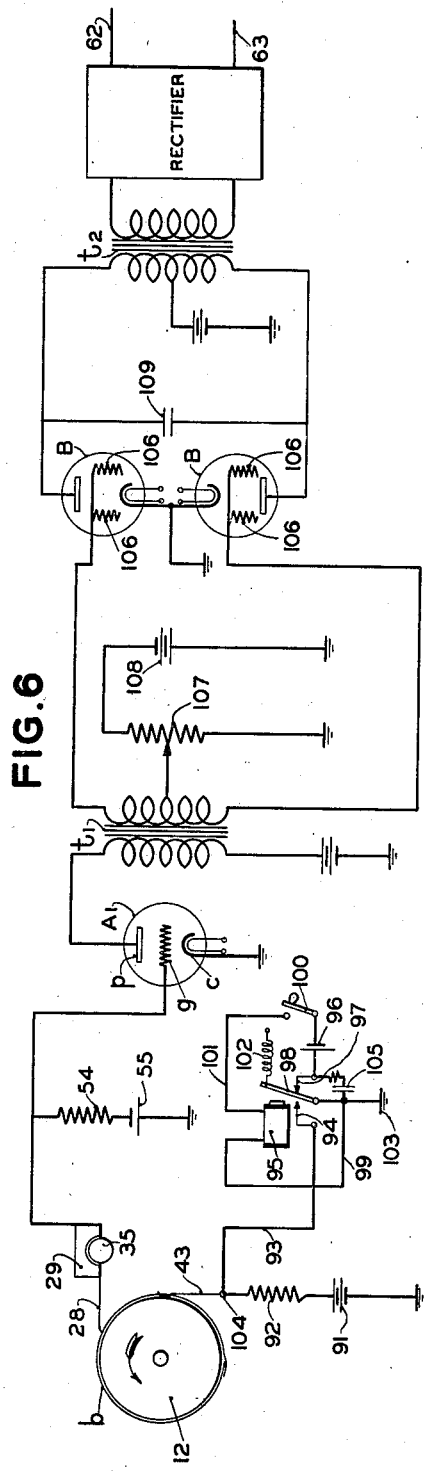
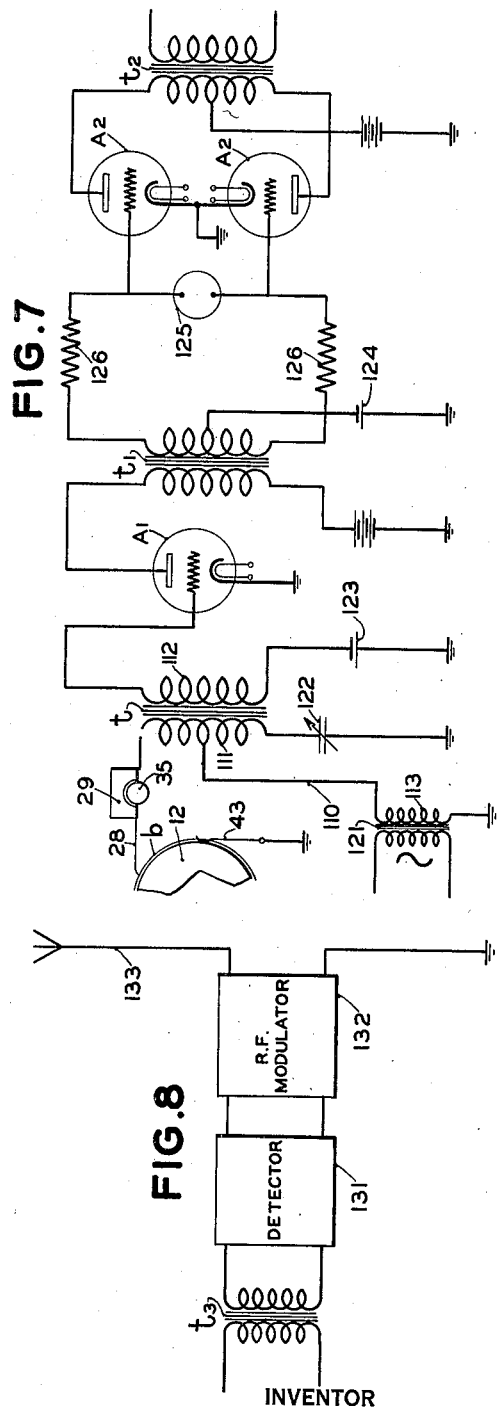
INVENTOR
R.J.WISE
BY
*Eugene C. Brown*
ATTORNEY April 11, 1939.  R. J. WISE  2,153,858
TELEGRAPHIC TRANSMISSION OF INTELLIGENCE
Filed May 28, 1935  6 Sheets-Sheet 5
FIG. 9
(a)
Telegram
SIGNALS IN SCANNING CIRCUIT  (b)
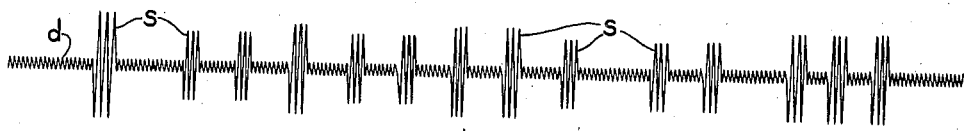
BACKGROUND REMOVED  (c)
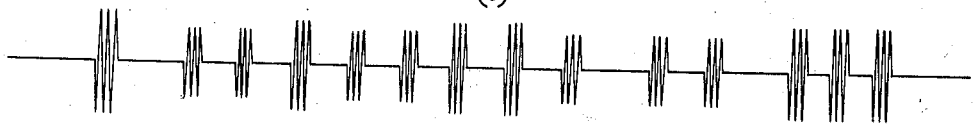
SIGNALS LEVELED  (d)
SIGNALS RECTIFIED  (e)
INVENTOR
R.J. WISE
BY
Eugene C. Brown
ATTORNEY April 11, 1939.  R. J. WISE  2,153,858
TELEGRAPHIC TRANSMISSION OF INTELLIGENCE
Filed May 28, 1935  6 Sheets-Sheet 6
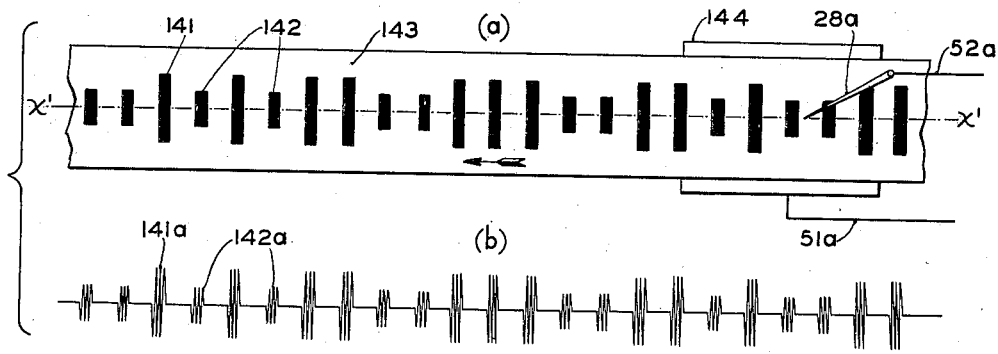
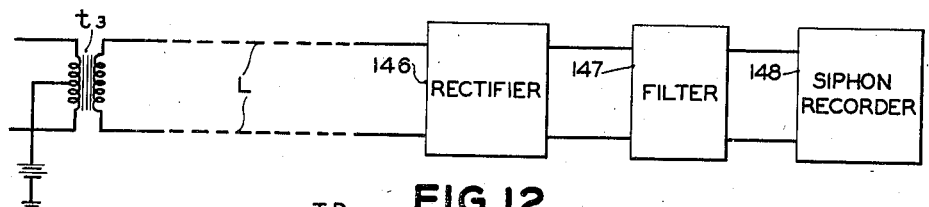
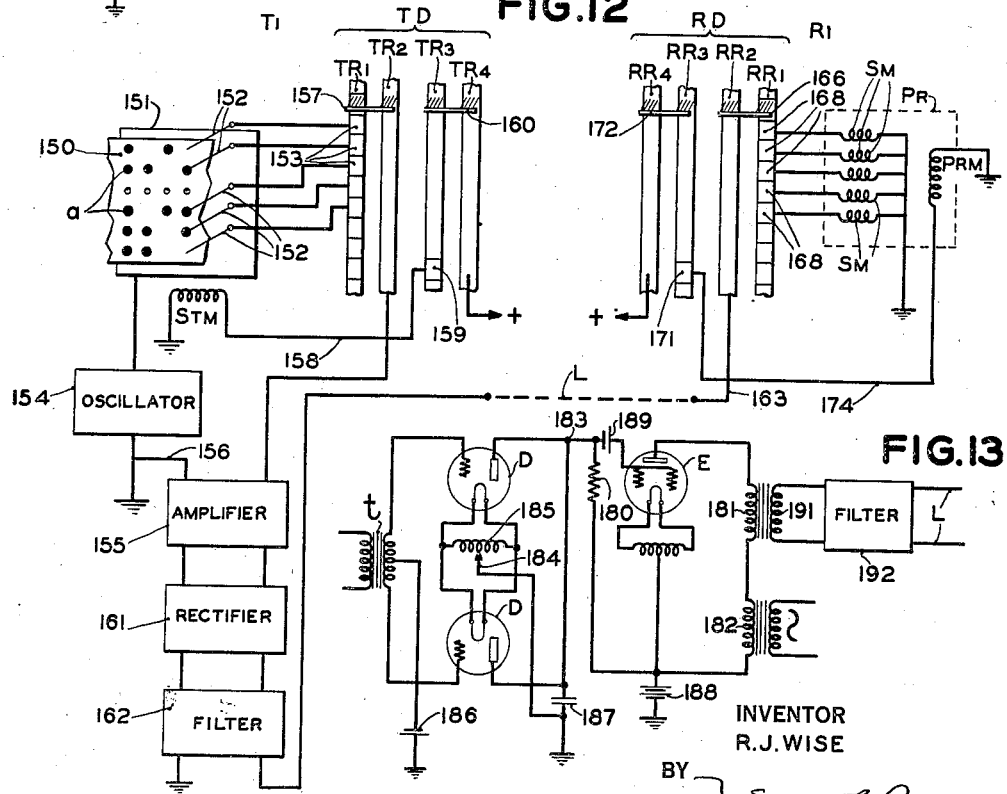
INVENTOR
R.J. WISE
BY Eugene C. Brown
ATTORNEY Patented Apr. 11, 1939

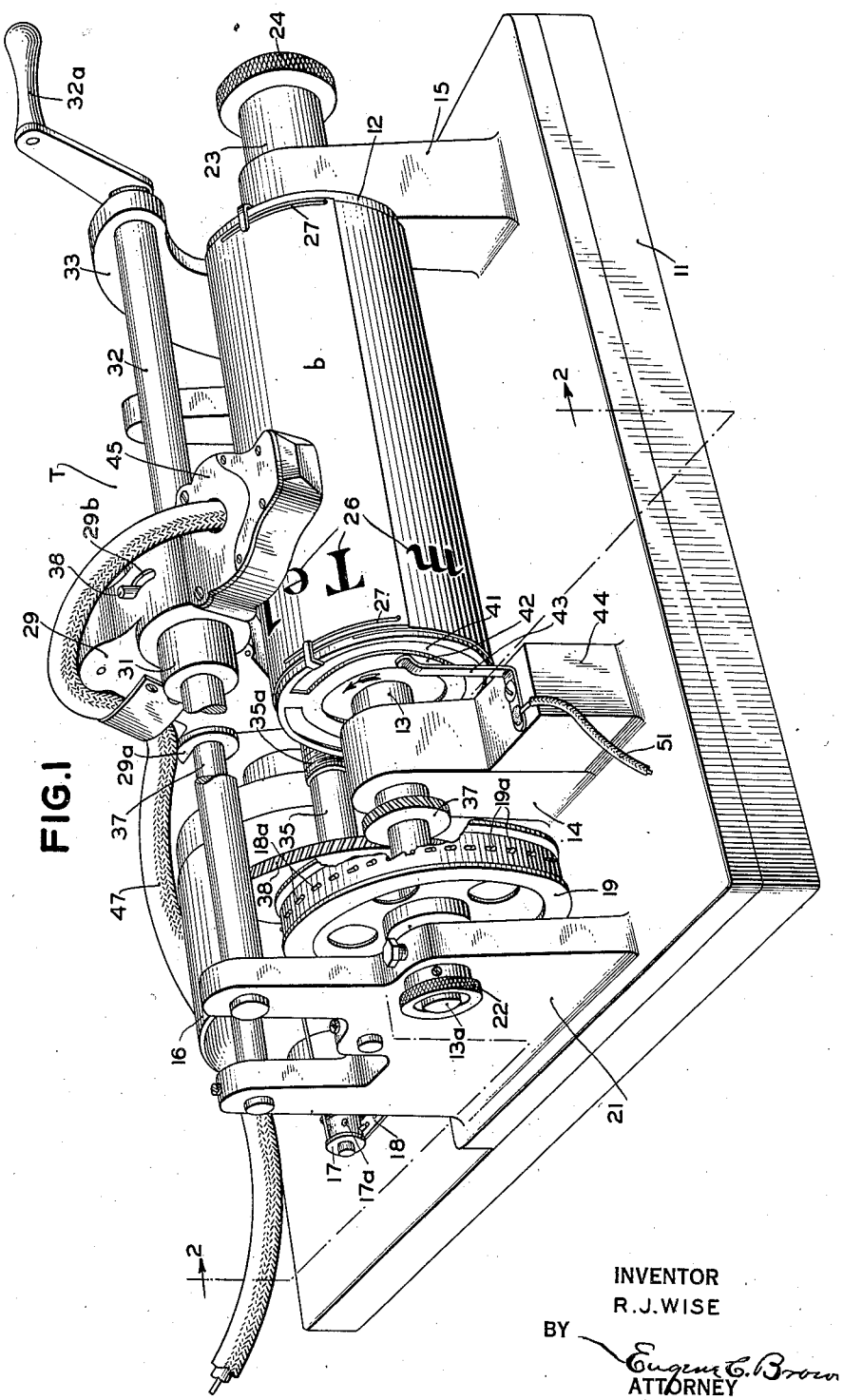

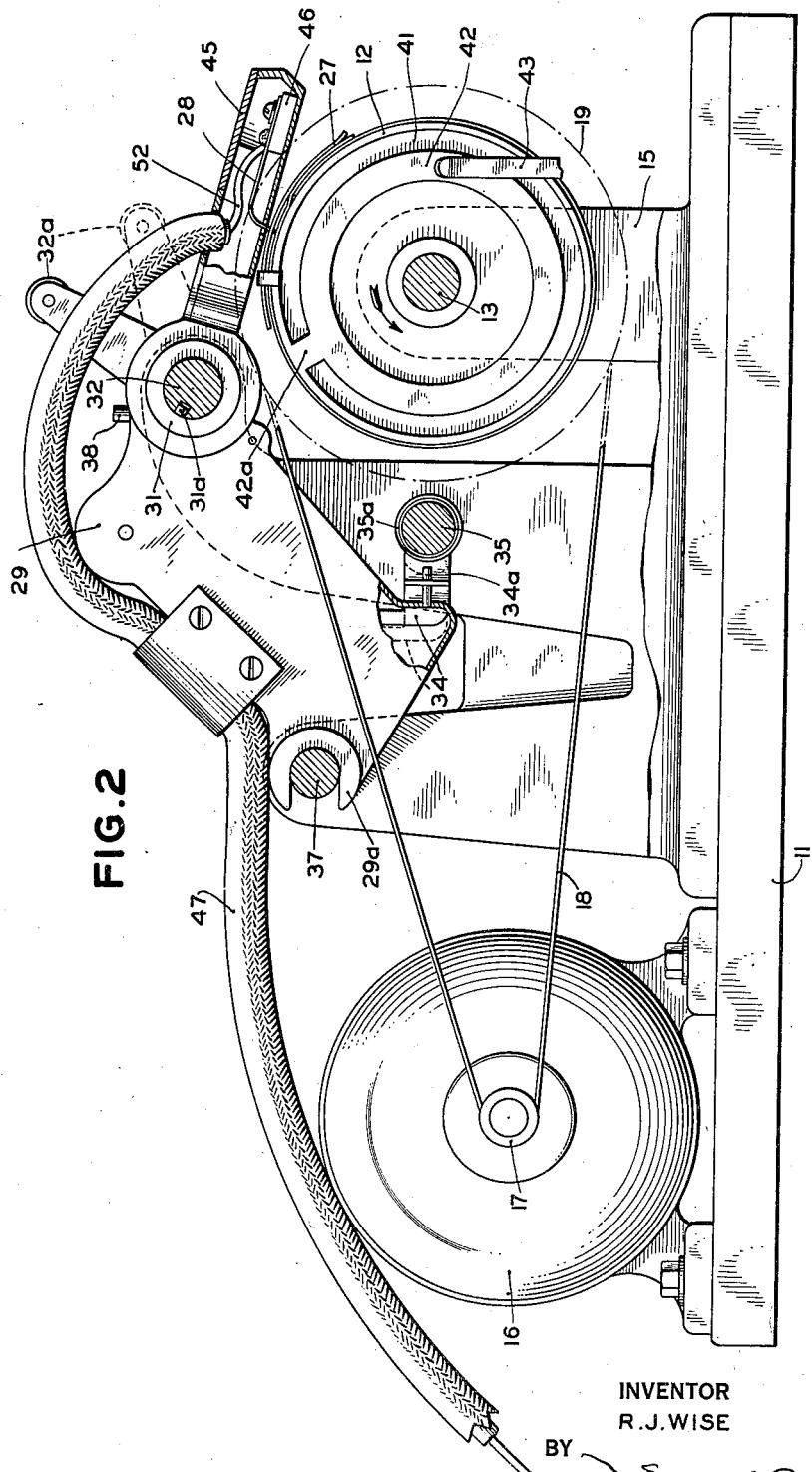

2,153,858

UNITED STATES PATENT OFFICE 2,153,858

TELEGRAPHIC TRANSMISSION OF INTELLIGENCE

Raleigh J. Wise, Dunellen, N. J., assignor to The Western Union Telegraph Company, New York, N. Y., a corporation of New York Application May 28, 1935, Serial No. 23,926

7 Claims. (Cl. 178—5)

This invention relates to a method of, and apparatus for, telegraphic transmission of intelligence, and more particularly to the transmission over wire, radio, or other communication channel, of telegrams and other subject-matter written or printed on, or otherwise applied to, a sheet, plate or other carrier member.

One object of the invention is a system in which the various letters, characters, indicia or other component parts of the message or other subject-matter to be transmitted, comprise an area or areas of a conductive substance having the property of electrical capacitance so that each such area when connected to an energizing circuit comprises one armature of an electrical condenser, an armature of opposite polarity being provided by a conductive member separated by a dielectric medium from the first named armatures, scanning means being provided for successively connecting the first named armatures to a signal circuit in such manner that electrical impulses or trains of impulses are produced which are representative of the separate condenser effects of the first named armatures, these electrical impulses being utilized to cause the transmission of electric currents, waves or signals in accordance with the respective characters or areas of the subject-matter scanned, and which may be employed to reproduce the subject-matter, or to produce effects in accordance therewith, at a receiving apparatus.

Another object of the invention is to provide a simple, efficient and inexpensive system and apparatus for the telegraphic transmission of telegrams, messages, pictures and/or other subject-matter.

A further object of the invention is to obviate the necessity of providing at the transmitting station specially prepared records on which the subject-matter to be sent is first reproduced, as in various systems heretofore proposed, and to enable the telegram, message, or other subject-matter to be transmitted directly from the ordinary telegraph blank, paper or other conventional material on which such subject-matter is usually disposed; more specifically, the various letters, characters or other component areas of the subject-matter themselves form active condenser plate areas or capacitances for producing electrical signalling impulses in accordance with or representative of such letters, characters or areas.

An additional object is to provide a scanning device employing a capacitance pick-up member for use in a system of the character disclosed, which device is unaffected by stray electric or magnetic fields.

These and other objects of the invention will appear from the following description of several illustrative forms thereof, taken in connection with the accompanying drawings, in which:

Fig. 1 is a perspective view of one form of transmitting apparatus in accordance with the invention;

Fig. 2 is an end view, partly in section, taken substantially along the line 2—2 of Fig. 1, with certain parts broken away more clearly to show the construction of the scanning member employed;

Fig. 3 shows one circuit arrangement of a transmission system embodying the invention;

Figs. 4 to 8 show alternative circuit arrangements which may be employed in practicing the invention;

Fig. 9 illustrates various wave forms obtained in different portions of the transmitting circuits during the transmission of the word "Telegram";

Figs. 10 and 11 show a method of transmitting and utilizing signals which vary in amplitude in accordance with the active condenser plate areas of the respective conductive characters;

Fig. 12 illustrates how the invention disclosed may be utilized in connection with a permutation code multiplex printing system; and Fig. 13 discloses a further alternative circuit arrangement which may be employed.

The system of the invention operates most effectively when transmitting from subject-matter embodying an image-bearing surface upon which the images, such as words or pictures, are delineated by alternate conductive and non-conductive areas. Such subject-matter may be provided, for example, by printing, writing or drawing with a conducting ink or other conducting substance upon a non-conducting or dielectric substance, such as paper. Matter written with an ordinary graphite or lead pencil or like conductive material deposited upon the paper may also be employed. Messages typewritten with a ribbon impregnated with conducting ink or by carbon paper is another form which the subject-matter may assume.

Subject-matter of this character comprises areas of a conductive layer or coating, for example, the letters or words of a telegram, separated by areas which are substantially non-conductive, as the blank portions of the paper sheet on which the telegram is written. The conductive areas are for the most part separate individual areas varying through a wide range of sizes from a minimum useful size upward, which minimum useful size may, in the case of printed or written matter, be regarded as the dot for a small letter "i" or a period.

In accordance with the invention, an area of subject-matter of the character described is disposed upon or brought near a conductive surface of appreciable size, such as a metallic plate, with the conductive surface areas spaced from the larger surface or plate by a dielectric substance, as the paper of the telegraph blank. In this manner, each of the individual conductive areas of the subject-matter together with the plate form the two armatures of a small condenser which, when suitably connected to a signal circuit having impressed thereon a source of varying potential, will cause a flow of current in the signal circuit. When the metallic plate is connected to one leg of the circuit, and an electrode or stylus connected to another leg of the circuit is disposed in opposed position to the plate and arranged to engage the image surface of subject-matter between it and the plate, and relative movement between the stylus and subject-matter is effected in such a manner as to produce scanning action, the individual conductive areas of the subject-matter are successively connected to the other leg of the signal circuit to cause flow therein of electrical currents or groups of oscillations or impulses representative of or in accordance with the signals to be transmitted. These signal currents preferably are amplified or are caused to modulate or control other currents to provide increased signal strength, and are transmitted to a receiving station to there reproduce, in facsimile or otherwise, the subject-matter at the transmitting station.

The flow of signal current produced at the stylus or other scanning means is of a duration corresponding to the length of time of contact of the stylus point with the letter, character or other conductive area as it is scanned, and the amplitude of the respective signal currents in the scanning circuit will, in general, vary in accordance with the different sizes of the letters, characters or other conductive areas comprising the subject-matter transmitted. In accordance with one form of the invention, means are provided for eliminating or reducing variations in amplitude of the signals so that signals substantially uniform in amplitude, varying only in signal length, are transmitted; in another form of the invention the signals transmitted vary in amplitude in accordance with the different sizes of the conductive areas scanned; and in still another form of the invention the signals transmitted are uniform in amplitude and length, irrespective of the relative sizes of the conductive areas scanned.

Referring now to Figs. 1 and 2 of the drawings, there is shown one illustrative embodiment of a transmitter T for practicing the invention. Supported on a base plate 11 is a rotatable metallic cylinder 12 carried by a centrally disposed driving shaft 13 which is journalled in bearings 14 and 15. When transmitting signals, the cylinder is rotated, in the direction indicated by the arrows, by any suitable device, such as an electric motor 16, preferably of the alternating current synchronous type, which is connected in the illustrative form shown by a driving pulley 17 and belt 18 to a driven pulley 19 keyed to the shaft 13. To prevent slippage, the pulleys have pins 17a and 19a thereon which are received in slots 18a in the belt. One end 13a of the shaft, which passes through a bracket or frame member 21, has a bushing or collar 22 adjustably secured thereto by a set-screw, the bushing coacting with the frame member 21 to limit longitudinal movement of the shaft in one direction, and the other end of the shaft has a collar or sleeve 23 adjustably secured thereto, the sleeve coacting with the bearing 15 to limit longitudinal movement of the shaft in the opposite direction. A knurled handle 24 secured to the sleeve 23 enables the cylinder 12 to be turned by hand in either direction.

The characters or images 26, Fig. 1, comprising the subject-matter, for example, a telegram, to be transmitted may be written, typed or otherwise applied, with conductive ink or other suitable conductive substance, on a non-conductive sheet b, for example, a telegraph blank, after which the sheet is wrapped once around the metallic cylinder 12 in the manner shown in the figure and secured to the cylinder in any desired manner, as by spring clips 27 carried by the cylinder. A scanning electrode or stylus 28, Fig. 2, whose point bears on the surface of the sheet b, is supported by a traveling carriage 29 having a sleeve 31 adapted for sliding movement along a splined shaft 32 mounted in bracket members 21 and 33. The carriage 29 includes a pivoted lever 34 having at its lower end a blade shaped portion 34a which normally engages in a spiral groove 35a on a rotatable shaft 35 screw-threaded throughout the greater part of its length, the shaft 35 being rotated, by driving gears 37 and 38 keyed to the shafts 13 and 35 respectively, whenever the cylinder 12 is rotated. Thus, the stylus is caused to traverse the cylinder in a longitudinal direction (from left to right in Fig. 1) as the cylinder rotates, the pitch of the thread on the shaft 35 determining the extent of longitudinal traverse of the stylus during each rotation of the cylinder. A flanged portion 29a of the carriage 29, Fig. 2, slidably engages a fixed guide rod 37 and maintains the carriage in proper position as it traverses the shaft 32. In this manner the stylus point will describe a spiral path as it moves over the surface of the paper and thus produce a scanning action.

After the blank b has been scanned, it is taken off the cylinder and another blank placed thereon for sending another telegram. By turning the handle 32a of the splined shaft 32 to the dotted line position shown in Fig. 2 the sleeve 31, which has a stud 31a received in the spline of the shaft 32, causes the blade member 34a to become disengaged from the groove 35a of the shaft 35, as shown in the dotted line position of the blade member, and the carriage 29 may be slid back across the cylinder to its starting position. The extent of rotation of the handle 32a and the shaft 32 are limited by a pin 39 received within the slotted portion 29b of the carriage, the pin being secured to the sleeve 31.

The foregoing method of obtaining a scanning movement per se is well known, as are various other methods of scanning a given field, and it is to be understood that any of the known methods of scanning suitable for the purpose may be employed in lieu of the foregoing method described.

The metallic cylinder 12 is electrically insulated from the apparatus by an insulating drum 41 interposed between the cylinder and the shaft 13. The drum 41 carries a metal slip ring 42 electrically connected at 42a to the cylinder 12, and a stationary brush or other contact member 43, mounted on an insulating block 44, bears against the ring 42 and electrically connects the cylinder 12, which comprises one plate of a condenser, to one leg 51 of a signal circuit hereinafter described. The other leg 52 of the signal circuit is connected to the scanning electrode 28, Fig. 2, which remains in contact with the sheet b. In the form shown the electrode is a spring pressed stylus, the point of which preferably is of very small cross-sectional area, and is bent as shown so that it is substantially normal to the surface of the cylinder 12, whereby any residual capacity effect between the stylus and the cylinder is minimized. If found desirable or necessary, the outer surface of the cylinder 12 may be covered with a film or layer of varnish, enamel or other insulating material to insure that the conducting areas of the sheet b will at all times be properly spaced from the cylinder.

In order to minimize or obviate the effect of stray electric and magnetic fields, the stylus may be enclosed in a grounded housing 45 composed of a metal of low reluctance, such as wrought iron, which effectively shields the stylus from disturbing fields, the stylus being insulated from the housing by a block of insulation 46, Fig 2, on which the stylus is mounted, the tip of the stylus passing through a small opening in the under side of the housing, as shown in the figure. Also, the leg 52 of the signal circuit may be enclosed in a grounded metal covering or tubing 47 to shield the conductor from stray electric and magnetic fields.

Fig. 3 shows a circuit arrangement adapted to be utilized with the transmitter of Figs. 1 and 2 for sending a telegram over a line L to a receiving station R. A varying potential obtained from a source 53 of alternating current is continuously applied through the leg 51 of the signal circuit to the cylinder 12. The frequency of the alternating current may vary within wide limits, depending upon the purpose for which the system is employed, the desired rate of scanning or speed of operation, the constants of the line L over which the subject-matter is transmitted, and other factors. In the illustrative embodiment shown, in which a telegram is sent by the transmitter T, the frequency of the alternating current supply 53 preferably is of the order of twenty-five hundred cycles. The circuit from the alternating current source 53 includes the metal cylinder 12 which forms one plate of a condenser; the other leg 52 of the signal circuit is connected to the grid $g$ of a thermionic amplifier tube A1. The alternating current circuit is completed, whenever the scanning electrode 28 engages a conductive area on the sheet b, through the electrode 28, conductor 52 and grid of the tube A1 to the grounded cathode c of the tube.

When the electrode or stylus 28 engages a conductive area of the subject-matter to be transmitted, for example, one of the letters or the word "Telegram", the capacity effect between the conductive ink of such letter and the metal cylinder 12 causes electrical oscillations to be impressed upon the grid of tube A1 during the period of contact of the stylus 28 with the letter. The grid is suitably biased, as by a grounded C battery 55 applied through a grid leak resistance 54, the resistance also preventing the battery 55 from short circuiting the legs 51 and 52 of the signal circuit. When the stylus 28 moves off the conductive surface of the letter, the alternating current circuit is substantially interrupted so that signal oscillations are no longer impressed upon the grid of the tube A1. Actually, however, there is a small residual capacity effect remaining between the tip of the stylus and the cylinder 12 which introduces a background effect, as indicated at $d$ in Fig. 9(b) which shows the wave form of the oscillating signal currents flowing in the scanning circuit for the various letters of the word "Telegram" as the letters are scanned by the stylus along the path indicated by the broken line $x$—$x$ of Fig. 9(a). It will be noted that the various signals S, Fig. 9(b), vary in amplitude depending generally upon the relative sizes of the conductive areas of the different letters, shown directly above the signals. In other words, the amplitude of each signal depends directly upon the size of the effective area of the condenser armature at the time contacted by the stylus 28.

The plate current in the amplifier tube A1 is varied in accordance with the signals impressed upon the grid of the tube, and the signals thus amplified are transferred through an iron core transformer $t1$ to the input circuit of a push pull amplifier stage comprising two tubes A2. The C biasing battery 57 for the tubes A2 is connected through a potentiometer 56 and conductor 58 to the midpoint of the secondary of the transformer $t1$, and the potentiometer preferably is adjusted to make the grids sufficiently negative so that the background $d$, Fig. 9(b), is eliminated as shown in Fig. 9(c). After further amplification of the signals in the first push pull amplifier, the signals are transferred through transformer $t2$ to the input circuit of a second push pull amplifier comprising tubes A3. The grids of the tubes A3 are biased by means of a C battery 59 through conductor 61 to the midpoint of the secondary winding of transformer $t2$. The output of the second push pull amplifier A3 is transferred through a transformer $t3$ to the output terminal 62 of the transmitting circuit, the signals passing over a line L to the input terminal 64 of a receiving apparatus R.

At the receiving end the recording may be accomplished by any of various known methods of recording suitable for the purpose. The embodiment illustrated in Fig. 3 shows one such method of recording in which a web $w$ is mounted upon a rotating cylinder 65 of substantially the same diameter as the cylinder 12 of the transmitter T. The cylinder 65 is rotated in synchronism with the sending cylinder 12 by means of an alternating current synchronous motor 66 or other kind of motor which is kept in step with the sending motor 16 by any of the many known methods of maintaining synchronism. The web $w$ is chemically treated so that the passage of signal current therethrough produces color changes in the chemical with which the web is treated, such processes being well known and therefore not described here in detail. Preferably, a dry recording web is employed, such as shown in the application of R. J. Wise, B. L. Kline and M. A. Rudd, Serial No. 23,928, filed concurrently herewith, in which the web is affected by the application of electrical potential to the stylus or scanning electrode of the receiver to record the subject-matter transmitted. The incoming signal currents are conducted to the web $w$ by means of a stylus 67 arranged with its point in continuous contact with the web, the stylus being mounted on a carriage 68 resting upon a threaded shaft 69 rotated with the cylinder 65. The threaded shaft in combination with the rotation of the cylinder produces a scanning action of the stylus 67 in the manner described with reference to the transmitter. If desirable or necessary, the incoming signals may be repeated and amplified, in a manner well known in the art, to translate the signals into suitable current pulses which pass through the web to produce the received image. When synchronism of the rotating parts and the scanning movements of the styli at the sending and receiving stations is properly maintained, the image upon the blank b at the transmitter will be reproduced upon the web w at the receiver as scanning proceeds.

Fig. 4 shows a modified arrangement of one of the stages of the amplifier of Fig. 3, in which the signals impressed upon the grids of the tubes A3 of the push pull amplifier are prevented from reaching an amplitude such as to deleteriously affect or endanger the tubes, by the employment of a voltage regulating device such as a gaseous condition or glow discharge tube 75 which may comprise a small neon lamp. When the potentials impressed upon the input circuits of the tubes A3 reach an excessive value, ionization of the tube 75 will occur to an extent such that a discharge may readily take place between its electrodes, which discharge relieves the excessive charges on the grids of the amplifiers. Resistances 76 are placed in the circuit between the secondary of the transformer t2 and the tube 75 to limit the amount of current drawn by tube 75 when operating. The signals in the output circuits of the amplifier tubes A3 will have the same form as those in the output circuit of the transmitter shown in Fig. 3, except that the maximum amplitude of the signals will not exceed a predetermined value.

In cases where the line L is suitable for handling very low frequencies only, for example, frequencies of a hundred cycles or less, as is the case with various lines employed for ordinary telegraph service, the signal currents in the output circuit of the transmitter may be repeated to the line either as positive or negative direct current pulses or as positive and negative direct current pulses, as may be desired. One arrangement for accomplishing this is shown in Fig. 5, in which the plate circuits of the tubes A3 are connected by a conductor 78 to the winding of a relay 80 and thence to grounded plate battery 81. The relay 80 has an armature 82 which, when the relay is not operated, is biased by a spring 83 to a position such that it engages a break contact 86. In this position, a circuit is completed from negative (marking) battery 84, through resistance 85, break contact 86 and armature 82 of relay 80, and through conductor 87 to the line L. When the signals impressed upon the grids of the tubes 83 cause the plate battery 81 to actuate the relay 80, its armature 82 pulls up and engages its make contact 90, at which time the circuit from negative battery 84 is disconnected, and a circuit completed from positive (spacing) battery 88, resistance 89, make contact 90 and operated armature 82 of relay 80, and thence over conductor 87 to the line L. A smoothing condenser 79 smooths out the impulses in the plate battery circuit and prevents chattering of the relay 80. In this manner marking and spacing conditions will be applied to the line L depending on whether the stylus 28 of the transmitter is in contact with one of the conductive characters of the message or whether it is on a non-conductive area of the blank b.

The foregoing arrangement may also be utilized to provide an inversion of the subject-matter to be transmitted, useful for various purposes, in which the subject-matter received at the receiving station is inverted with respect to the subject-matter at the transmitter. For example, with black and white subject-matter a black area produced by a conductive substance on the sheet b at the transmitter may be reproduced as a white or blank area at the receiver and conversely the white or blank area of the sheet at the transmitter may be reproduced at the receiving station as a black area. This may readily be accomplished by causing the negative (marking) battery to produce at the receiving station a black area, and causing the positive (spacing) battery at the receiving station to reproduce a white or blank area. The step of inverting the subject-matter transmitted may advantageously be used to minimize the effects of static and other transient disturbing impulses superimposed upon the signals transmitted over the line L. Thus, the effect of the disturbing impulses will be only to make a white streak in the white or blank areas of the subject-matter recorded on the receiver, which is not conspicuous, whereas, when the subject-matter is not inverted a black streak would result which is very conspicuous and which may be misleading as to the subject-matter intended. When the subject-matter is inverted, the disturbing impulses may also cause a white streak in the black areas, but this is not as conspicuous or misleading as a black streak in a white area, which may result when the subject-matter is not inverted at the transmitting station. The transmitted matter may also be reversed upon reception to give a duplicate of the transmitted copy and still retain the advantages cited.

Fig. 6 shows a further modification of the transmitting circuit in which the source of varying potential is obtained by an interrupter 95, instead of from a source of alternating current. The circuit for energizing the interrupter comprises a local battery 96, switch 100, conductor 101, winding of the interrupter 95, conductor 99, armature or vibrator 98 and break contact 97, the vibrator 98 being biased by a spring 102 into engagement with the break contact 97. When the switch 100 is closed, current from the battery 96 energizes the coil 95, and the armature 98 is attracted to the core of the coil, at which time the armature opens the energizing circuit for the coil and engages the contact 94. Deenergization of the coal 95 permits the armature 98 to again contact the break contact 97 and close the coil energizing circuit, thus producing a vibrating action of the armature 98 in the manner of the armature of a spark coil. A condenser 105 is bridged across the contacts of the armature and break contact to reduce pitting or burning of the contacts. When armature 98 is in the position shown, grounded battery 91 is applied through resistance 92 and conductor 43 to the metal cylinder 12. When the armature 98 is attracted to the coil 95 and engages the make contact 94, a shunt circuit is closed from the grounded armature 98, make contact 94 and conductor 93 to a point 104 in the circuit of battery 91, thus interrupting any flow of battery from the source 91 to the condenser plate 12.

As the buzzer armature 98 is rapidly vibrated, there is thus caused to flow in the scanning circuit a rapidly pulsating current so long as the stylus 28 is in contact with a conductive area on the blank b. Oscillations are thus set up which are impressed upon the grid g of the tube A1 and are amplified thereby.

The signals in the plate circuit of the amplifier tube A1 are transferred through a transformer t1 to the input circuits of a pair of repeating tubes B arranged substantially in bridge circuit relation, these tubes comprising means for equalizing the amplitude of the various signals to produce signals having a wave characteristic such as shown in Fig. 9 (d).

The tubes B preferably are of the electrostatically controlled gaseous conduction type characterized by the fact that the grids 106 of the tubes act merely as means to start current flow through the tubes. After such tubes are once started, they continue to pass current independently of the potential of their grid. A further characteristic of these tubes is that they are started by the application of a very low positive potential upon the grid. For example, if the potential drop across the tube is 100 volts or less, the tube may be designed to start with a positive current of a few volts or even less than a volt, impressed upon the grid. After being started, a discharge through the tube continues independently of the grid voltage and substantially instantaneously reaches saturation or full operating current value.

A suitable potential is applied to the grids of the tubes by means of a battery 108 and a potentiometer 107 for controlling the normal bias voltage of the grids, the anodes of the tubes being provided with a suitable voltage by means of the plate battery connected to the midpoint tap of the primary winding of the transformer t2. In order to provide for extinguishing the tubes B alternately, so that when one of the tubes becomes energized the other will become extinguished, a condenser 109 is connected across the output circuit of the tubes. The action of this condenser when the charge thereon is suddenly reversed by the starting of one of the tubes, is to momentarily impress a negative voltage upon the anode of the other tube of sufficient value to cause the tube to become extinguished, at which time no further current passes through the tube.

In practice, the bias of the grids 106 is adjusted by means of the potentiometer 107 to a value such that the input from the conductive areas of the subject-matter which are below a useful size, such as minute conductive spots in non-conductive or background areas of the blank b will not induce a sufficent voltage in the secondary of the transformer t1 to raise the potential of the grids 106 to the starting values of their tubes. For this reason, any signal transfer accomplished by the pickup from these small areas will not produce a signal in the output of the transmitting circuit. However, by proper adjustment of the potentiometer 107 a point of threshold sensitivity may be obtained at which the signals induced by the smallest useful conductive area of the subject-matter, such as a period or the dot of an "i" in word subject-matter, will induce a voltage in the secondary of the transformer t1 of sufficient potential to raise the grids 106 to the starting values of the tubes.

As soon as one of the tubes B starts, depending upon whether the positive voltage was induced in the upper or lower winding of the secondary of the transformer, the tube will immediately begin to pass current at its full saturated value even though the signal originated from a minimum useful area. This will cause a voltage to be induced in the output of the transformer t2 of a definite value. As alterations of the input swing in the opposite direction, the voltages in the secondary of transformer t1 will reverse and cause the grid of the opposite tube to become positive and initiate current passage therein. This will cause a change in the potential across the condenser 109 which operates in known manner to extinguish the tube which was formerly passing current. This action in turn will, through the other half of the primary winding of the transformer t2, induce a voltage in the secondary of an opposite value which, being timed in synchronism with the input voltages, will result in an output of the transformer t2 of a frequency corresponding to the frequency input of the repeater.

As to the upper limit, assume that the stylus point of the signal pickup has moved from an area of a minimum useful value to a substantially larger conductive area of the subject-matter. As already explained, this will cause the passage of a group of frequencies from the signal source to the repeater of a substantially higher amplitude, and these in turn will cause the induction of higher voltages in the secondary of the transformer t1. However, as soon as the potentials of the grids respectively reach the starting point, the tubes continue operating at their same value as before. Consequently, the potential of the currents induced in the output transformer t2 will be of the same value as before, resulting in output currents of constant amplitude to give the desired signal level. Fig. 9 (d) shows the characteristics of the signals in the output circuit in the secondary of transformer t2.

If desired, and as shown in Fig. 6, the alternating current signals in the output circuits of the various transmitters may be passed through a rectifier, the resulting rectified line current having the form indicated in Fig. 9 (e).

Fig. 7 shows another arrangement for eliminating background when the scanning electrode or stylus 28 is on the nonconductive portions of the sheet b. The secondary winding 113 of the transformer 121 comprises a source of alternating current, the transformer winding having one end grounded and the other end connected by a conductor 110 to a midpoint tap on the secondary winding 111 of an input transformer t. The lower half of the winding is connected through a variable condenser 122 to ground, and the upper half of the winding is connected to the stylus 28. It will be seen that an alternating current circuit is provided through the grounded secondary 113, conductor 110, lower half of the primary winding 111, and condenser 122 to ground. When the stylus 28 is on a non-conductive area of the sheet being scanned, due to the residual capacity effect between the stylus 28 and cylinder 12, alternating current may also flow in a circuit comprising the upper half of the winding 111, stylus 28, the condenser formed by the stylus and the conductive plate 12, and conductor 43 to ground. The current from the source 113 therefore divides and flows in opposite directions in the respective halves of the transformer winding 111, and thus produce a differential effect. By a proper adjustment of the condenser 122, the current flowing in the lower half of the transformer winding may be made equal to that in the upper half of the winding at this time and will neutralize the effect thereof, so that no background current will be induced in the secondary winding 112 of the transformer.

During those periods that the stylus 28 is in contact with conductive areas on the sheet b, the currents flowing in the two halves of the transformer winding 111 are unbalanced and signals will be repeated into the input circuit of the amplifier A1.

A gaseous conduction or glow discharge tube 125, connected across the output of the transformer t1, may also be provided in the circuit of Fig. 7, the tube operating generally in the manner of the tube 75 of Fig. 4, the current through the tube being limited by resistances 126 connected in the respective grid circuits of the amplifier tubes A2.

Fig. 8 shows an arrangement in which the signals in the secondary winding of the transformer t3 are passed through a detector 131 to a radio frequency modulator 132, and are then broadcast by radio over an aerial 133.

Figs. 10 and 11 illustrate a method of transmitting signals which vary in amplitude in accordance with the size of the respective conductive areas scanned by the stylus. In Fig. 10 (a) the message to be transmitted is represented, for example, by long and short conductive marks 141 and 142, respectively, which conductive marks in the embodiment illustrated appear on a tape 143 which travels across the surface of the conductive plate 144 connected by a conductor 51a to the scanning circuit generally in the manner of the cylinder 12 of the foregoing modifications, the scanning electrode 28a being connected to another leg 52a of the signal circuit in any of the various arrangements hereinbefore disclosed. As the tape is caused to pass under the electrode or stylus 28a, the scanning action takes place along the path indicated by the broken line $x'-x'$, and signals 141a and 142a varying in amplitude, having the wave form shown in Fig. 10 (b) are produced in the scanning circuit. The resulting signals in the output transformer t3, Fig. 11, are transmitted over the line L or other communication channel to any suitable receiving apparatus which operates in accordance with the difference in amplitude of the respective signals. Such a receiver may comprise a rectifier 146 for changing the alternating signal currents received to pulsating or direct currents, a filter 147, and a siphon recorder 148, the construction and operation of which are well known in the art.

Fig. 12 illustrates one way in which the invention may be utilized in a multiplex printing telegraph system. The transmitter T1 comprises a tape 150, having imprinted thereon transverse rows of dots a, representative of a five unit permutation code, which are scanned by five styli 152. The tape passes over a conductive plate 151 to which is connected a source of varying potential, as from an oscillator 154. The styli 152 are respectively connected to five segments 153 of the segmented ring TR1 of the transmitting distributor TD, a solid ring TR2 of which is connected to one side of the input circuit of a thermionic amplifier 155. The other side of the input circuit of the amplifier is connected by conductor 156 to the grounded side of the oscillator 154. A stepping magnet STM for the tape is connected by conductor 158 to the segment 159 of a local ring TR3. The distributor brush 160 is in engagement with the local segmented ring TR3 and the local solid ring TR4, and when the brush passes onto the segment 159, battery from the ring TR4 flows through the brush 160, segment 159, conductor 158, and the start magnet STM to ground, thus stepping the tape one step forward. Various suitable devices for stepping the tape forward are well known in the telegraph art and, therefore, the stepping device is not described here in detail.

As the various styli 152 engage the conductive areas represented by the dots a, one or more circuits are completed from the oscillator 154, condenser plate 151, conductive material of the dots a, through the associated styli 152 to the respective segments of the transmitting distributor ring TR1. As the distributor brush 157 successively traverses the segments 153, alternating current signals through those styli which are in contact with the conductive dots are successively transmitted through the solid ring TR2 to the amplifier 155 and thence to conductor 156 of the oscillator circuit. From the amplifier 155 the signals pass through a rectifier 161 and filter 162 to the line L.

Any suitable means may be employed for receiving and utilizing the signals at the receiving station R1. For example, and as shown, the signals may be received over a conductor 163 connected to the solid ring RR2 of the receiving distributor RD, the receiving distributor having brushes 166 and 172 rotating in synchronism with the brushes 157 and 160 of the transmitting distributor. As the brush 166 successively passes across the segments 168 of the ring RR1, the signals pass through certain of the selecting magnets SM of the printer Pr to ground, and thus set up a code combination corresponding to the combination of the conductive and nonconductive areas on the tape 150 contacted at the time by the styli of the transmitter. After the brush 166 passes the last of the five segments 168 associated with the selecting magnets SM, the local brush 171 passes onto the segment 171 of the local ring RR3, thus completing a circuit from battery through solid ring RR4, brush 172, segment 171, and conductor 174 to the printing magnet PrM of the printing unit, to print a character represented by the code impulses received.

Fig. 13 illustrates another method by which the subject-matter at the transmitter may be reproduced in inverted form at the receiver, whereby the signals transmitted in accordance with the capacity effects of the conductive areas of the subject-matter transmitted produce corresponding blank areas on the web w at the receiver and the blank areas of the subject-matter to be transmitted produce contrasting or black areas on the web w. The signal impulses produced in the scanning circuit are repeated through a transformer t and applied to the grids of the full wave rectifier comprising two rectifier tubes D, the output circuit of the rectifier being connected across a resistance 180 in the grid circuit of an electrostatically controlled gaseous conduction tube E which is similar to the tubes B of Fig. 6.

The plate circuit of tube E includes the primary winding 181 of an output transformer and the secondary winding 182 of a transformer which comprises a source of alternating current plate supply. The anodes or plates of the rectifier tubes D are connected together at 183, and the cathodes of the tubes are connected to ground through a midpoint tap 184 on the filament heater circuit transformer 185. The grids of the rectifier tubes D are suitably biased by a battery 186 to give the desired rectifying action, the biasing potential being applied to the grids through a midpoint tap on the secondary winding of the transformer t. A smooth-condenser 187 is connected across the output circuit of the rectifier to maintain its output current substantially constant and uniform.

When the stylus 28 of the transmitter is on a non-conductive area of the sheet b, no current from the scanning circuit sufficient to operate the rectifier tubes is impressed on their grids and no plate current from the battery 188 flows in the output circuit of the rectifier at this time. The positive biasing potential of the battery 189 is such that the charge at this time on the grids of tube E energizes the tube and permits plate current to flow during each positive half cycle of the alternating current from the transformer 181, thus causing alternating signalling current to be induced in the secondary winding 191 of the output circuit of tube E. This current, which is passed through a filter 192 to give a more suitable wave form thereto, flows through the line L so long as the stylus remains on the non-conductive area.

When the stylus engages a conductive area on the sheet b, sufficient current from the scanning circuit is impressed upon the grids of the rectifiers to cause them to operate. The resulting output current in the plate circuit of each rectifier tube as it operates flows through the resistance 180, and the potential drop across the resistance causes a negative charge to be impressed upon the grids of tube E of sufficient magnitude to overcome the positive charge and extinguish the tube and prevent flow of current in its plate circuit, during which periods no flow of signal current occurs in line L.

At the receiving station, if desired, the received signals may again be inverted by any suitable means so that the subject-matter will be recorded in the same form in which it originally appeared at the transmitter.

In various of the foregoing circuit arrangements illustrated, the line L is shown as a single conductor with a ground return, but it will be understood that the line may be a complete metallic circuit, as indicated by the conductors L and L1 in Fig. 4, or that the line may comprise any other channel of communication or lane of traffic suitable for the purpose.

For brevity in the specification and claims, the term "rapidly varying potential" is employed in a generic sense to define an alternating, pulsating, interrupted or other varying current suitable for use with a condenser circuit to practice the invention herein; the term "armature" as applied to a condenser defines any conductive area, layer or surface adapted to form an electrode or active plate area of a condenser; and the expression "scanning" refers to relative movement between the scanning electrode and the subject-matter to be transmitted, by movement of either or both, so as to cause the electrode to traverse, or be traversed by, one or more times, the various characters or component areas of said subject-matter.

While there are shown and described herein certain illustrative embodiments of the invention, many other and varied forms and uses may present themselves to those versed in the art without departing from the invention, and the invention is, therefore, not limited either in method or structure, except as indicated by the terms and scope of the appended claims.

I claim:

1. A method of transmitting intelligence which comprises forming the various letters, characters or other component parts of the subject-matter each from a layer of a conductive substance applied to a non-conducting medium, scanning said subject-matter in such manner as to apply a source of rapidly varying potential successively to said conductive layers to cause said layers each to function at the time scanned as an armature of an electrical condenser, producing signal currents of different amplitudes respectively in accordance with the different areas of the conductive layers scanned, and restricting the signal currents thus produced between definite maximum and minimum values so that the signal currents transmitted are of uniform amplitude.

2. A system for the telegraphic transmission of intelligence comprising a carrier medium having applied thereto the various letters, characters or other component parts of the subject-matter comprised of areas of a conductive substance, means for scanning said subject-matter and for applying a source of charging potential to said conductive areas in succession to cause the areas each to function as an armature of an electrical condenser, means including said condenser armatures for producing signal currents of different amplitudes respectively in accordance with the different sizes of the active areas of the armatures scanned, and means for restricting said signal currents between definite maximum and minimum values so that they are of uniform amplitude.

3. In a transmitter for scanning subject-matter having an image surface comprising conductive areas adapted to produce electrical capacitance effects, a signal circuit in which the introduction of capacitance causes a signal to be produced, and a scanning electrode connected to said signal circuit adapted to engage the image surface to introduce capacitance effects in said circuit in accordance with said conductive areas, said scanning electrode having that portion thereof which engages the image surface reduced in size to less than the area of the individual conductive areas to minimize the residual capacity effect of the scanning electrode.

4. In a transmitter for scanning subject-matter having an image surface comprising conductive areas adapted to produce electrical capacitance effects, a signal circuit in which the introduction of capacitance causes a signal to be produced, a scanning electrode connected to said signal circuit adapted to engage the image surface to introduce capacitance effects in said circuit in accordance with said conductive areas, and a casing substantially enclosing the scanning electrode, said casing being apertured to receive the projecting tip of the electrode and composed of a material which shields the electrode from stray electric fields.

5. In a signalling system, means for producing image currents representing a picture or other subject matter, an output circuit, and a device between said means and said output circuit capable only of transmitting image signals above a predetermined strength whereby to eliminate transmission of background effects from said subject matter.

6. In a signaling system, means for producing image currents representing a picture or other subject matter, an output circuit, and a device between said means and said output circuit capable only of transmitting image signals above a predetermined strength whereby to eliminate transmission of background effects from said subject matter, said device comprising a pair of electrostatically controlled gaseous conduction type tubes and adjustable means for biasing the control electrodes of said tubes to prevent operation thereof in the absence of signals above a predetermined minimum strength.

7. In a signalling system, means for producing image currents representing a picture or other subject matter, an output circuit, a gaseous conduction tube connected to said output circuit, a source of alternating current connected to the output electrode of said tube, biasing means for the control electrode of said tube to cause said tube to be conductive to half cycles of said alternating current, and a rectifying device excited from said first named means and connected to the control electrode of said gaseous conduction tube to nullify the effect of said biasing means and thereby to cause said tube to become non-conductive when said signal currents increase in value.

RALEIGH J. WISE.